US012576450B2

(12) United States Patent
Tanaka et al.

(10) Patent No.: US 12,576,450 B2
(45) Date of Patent: Mar. 17, 2026

(54) WORKPIECE HOLDER AND MACHINING APPARATUS

(71) Applicant: NISSIN MANUFACTURING CO., LTD., Kyoto (JP)

(72) Inventors: Koji Tanaka, Kyoto (JP); Chiori Mochizuki, Kyoto (JP); Shingo Funai, Kyoto (JP); Kenji Inoue, Kyoto (JP)

(73) Assignee: Nissin Fulfil Co., Ltd., Kyoto (JP)

( * ) Notice: Subject to any disclaimer, the term of this patent is extended or adjusted under 35 U.S.C. 154(b) by 528 days.

(21) Appl. No.: 18/210,103

(22) Filed: Jun. 15, 2023

(65) Prior Publication Data

US 2024/0116115 A1 Apr. 11, 2024

(30) Foreign Application Priority Data

Jun. 15, 2022 (JP) ................................ 2022-096912

(51) Int. Cl.
| | |
|---|---|
| *B23B 13/10* | (2006.01) |
| *B23B 31/107* | (2006.01) |
| *B23B 31/171* | (2006.01) |
| *B23B 31/38* | (2006.01) |

(52) U.S. Cl.
CPC .... *B23B 31/1079* (2021.01); *B23B 31/16125* (2013.01); *B23B 31/38* (2013.01); *B23B 13/10* (2013.01)

(58) Field of Classification Search
CPC .......... B23B 31/1079; B23B 31/16125; B23B 31/38; B23B 13/10; B23B 31/113; B23B 31/16004; B23Q 7/04
See application file for complete search history.

(56) References Cited

U.S. PATENT DOCUMENTS

2006/0127194 A1 6/2006 Schafer

FOREIGN PATENT DOCUMENTS

| | | | |
|---|---|---|---|
| JP | S60-74923 A | | 5/1985 |
| JP | H1038018 A | * | 1/1998 |
| JP | H10-138018 A | | 5/1998 |
| JP | 2005-535466 A | | 11/2005 |
| JP | 2017173032 A | | 9/2017 |

OTHER PUBLICATIONS

Morizaki Eiichi; JPH1038018A; Machine Translation (Year: 1998).*
Office Action dated (with English translation) Jul. 2, 2024 issued for the corresponding Japanese Patent Application No. 2022-096912.

* cited by examiner

*Primary Examiner* — Lee A Holly
(74) *Attorney, Agent, or Firm* — Ohlandt, Greeley and Perle, LLP.

(57) ABSTRACT

A workpiece holder 1 includes a holder head 11 and a holder body 12. The holder head 11 includes a chuck unit 13 for holding a workpiece W, a support pedestal 111 for supporting the chuck unit 13, and a hook 113 provided on a distal end portion of an arm 112 extending from the support pedestal 111. The holder body 12 includes a cylindrical body portion 121, a retained portion 123 that is arranged inside the body portion 121 and rotated around the cylinder axis J1 to be in either a retained state in which the retained portion 123 is retained by the hook 113 on the −Z direction side or in the released state in which retaining by the hook 113 is released, and a disk spring 126 for biasing the retained portion 123 in the −Z direction.

9 Claims, 8 Drawing Sheets

WORKPIECE HOLDER AND MACHINING APPARATUS

FIELD OF THE INVENTION

The present disclosure relates a workpiece holder and a machining apparatus.

BACKGROUND OF THE INVENTION

An NC machining apparatus for a bone member including a bone member support portion supporting a bone member has been suggested (for example, see Unexamined Japanese Patent Application Publication No. 2017-173032). In a case where there are multiple bone members to be machined with this NC machining apparatus for the bone member, every time the machining of one bone member is finished, the bone member that has been machined is removed from the bone member support portion, and then a new bone member is attached to the bone member support portion before machining is started again.

However, since the bone member is generally fragile, removal of the bone member from the bone member support portion or attachment to the bone member support portion must be done carefully, and these operations take some time. In a case where multiple bone members are machined, the machining must be stopped while the bone members are attached and detached, resulting in a reduction in throughput.

The present disclosure has been made in view of the above circumstances, and it is an object of the present disclosure to provide a workpiece holder and a machining apparatus capable of improving throughput when machining multiple workpieces.

SUMMARY OF THE INVENTION

In order to achieve the above object, a workpiece holder according to the present disclosure includes:

a holder head that includes a chuck unit for holding a workpiece, a support pedestal for supporting the chuck unit, an arm extending to a side of the support pedestal opposite to the side of the chuck unit, and a hook extending in a direction perpendicular to an extension direction of the arm from a distal end portion of the arm, and a holder body that includes a body portion in a cylindrical shape for supporting the holder head in such a state that one end portion in a cylinder axis direction is in contact with a circumferential portion of the support pedestal, a retained portion arranged inside the body portion and rotated around a cylinder axis of the body portion to be in either a retained state in which the retained portion comes into contact with the hook and be biased in a direction away from the chuck unit so that the retained portion is retained on a side opposite to the side of the chuck unit by the hook, or a released state in which the retained portion does not overlap the hook in the cylinder axis direction so that retaining by the hook is released, and a biasing member for biasing the retained portion in a direction away from the chuck unit.

According to the present disclosure, a holder head that includes a chuck unit for holding a workpiece, a support pedestal for supporting the chuck unit, and a hook, and a holder body that includes a retained portion that can be either in a retained state in which the retained portion is rotated around a cylinder axis of the body portion so that the retained portion is retained by the hook, or in a released state in retaining by the hook is released are provided. Accordingly, when multiple workpieces are processed, multiple holder heads are prepared in advance, and while the holder bodies provided in the machining apparatus are caused to sequentially hold the multiple holder heads and multiple workpieces are sequentially processed, the task of causing the holder head to hold the workpiece and the task of collecting the workpiece from the holder head can be performed in parallel. Therefore, the throughput for processing multiple workpieces can be improved.

BRIEF DESCRIPTION OF DRAWINGS

A more complete understanding of this application can be obtained when the following detailed description is considered in conjunction with the following drawings, in which.

DETAILED DESCRIPTION OF THE INVENTION

A workpiece holder and a machining apparatus according to an embodiment of the present disclosure is described below with reference to the drawings. The workpiece holder according to the present embodiment includes a holder head for holding a workpiece and a holder body. The holder head includes a chuck unit, a support pedestal for supporting the chuck unit, an arm extending to a side of the support pedestal opposite to the side of the chuck unit, and a hook extending in a direction perpendicular to an extension direction of the arm from a distal end portion of the arm. The holder body includes a body portion in a cylindrical shape for supporting the holder head in such a state that one end portion in a cylinder axis direction is in contact with a circumferential portion of the support pedestal, a retained portion arranged inside the body portion and rotated around a cylinder axis of the body portion to be in either a retained state in which the retained portion comes into contact with the hook and be biased in a direction away from the chuck unit so that the retained portion is retained on a side opposite to the side of the chuck unit by the hook, or a released state in which the retained portion does not overlap the hook in the cylinder axis direction so that retaining by the hook is released, and a biasing member for biasing the retained portion in a direction away from the chuck unit. The workpiece holder according to the present embodiment makes it possible to improve the efficiency of attaching and detaching workpieces when processing multiple workpieces with relatively small dimensions and multiple types of shapes while frequently attaching and detaching them to/from the holder head. In addition, when used in a machining apparatus that processes biological tissue in the medical field, the holder head can be cleaned or sterilized after each processing, which can maintain the processing environment of the machining apparatus clean.

Figure 1:
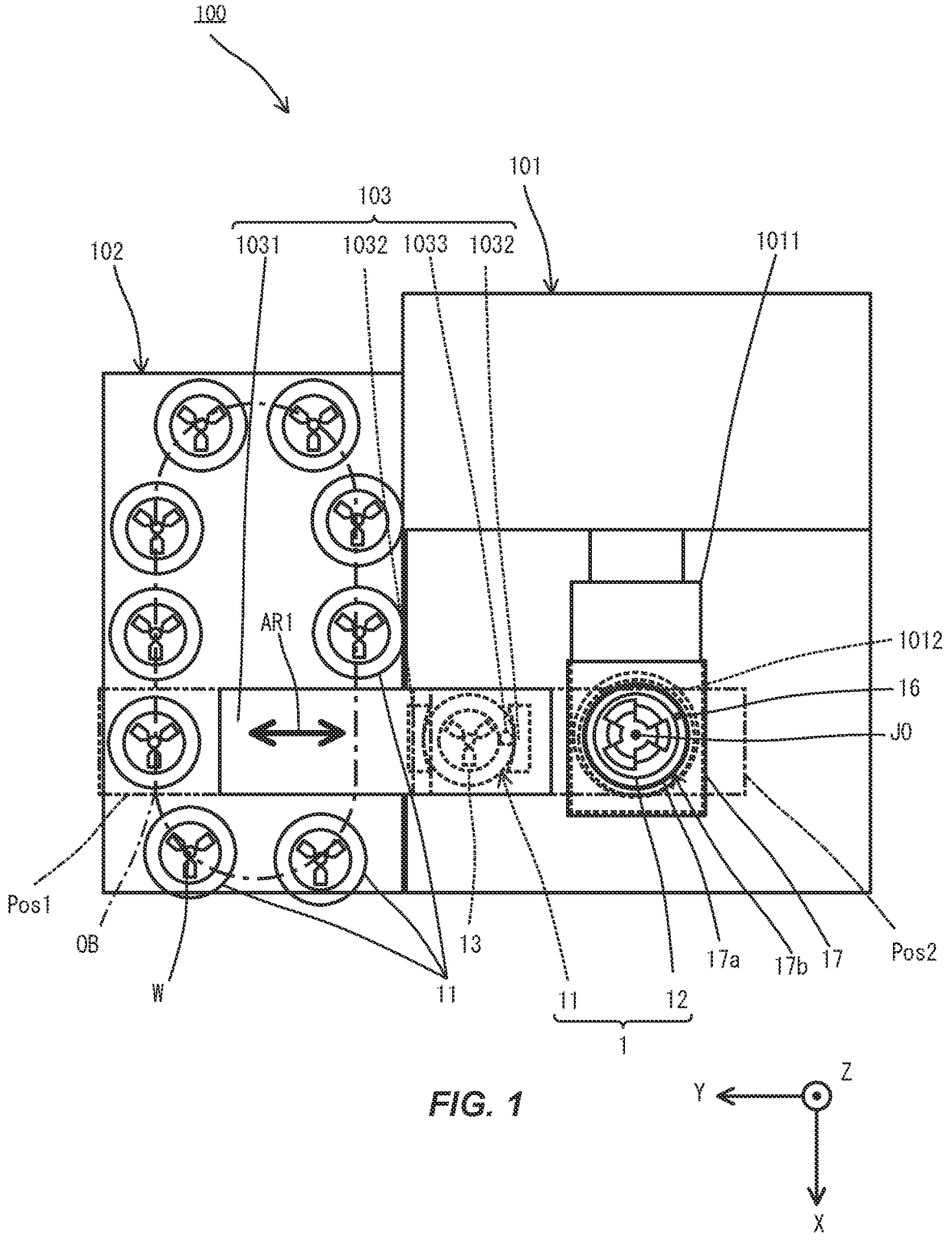
FIG. 1 is a schematic diagram illustrating a machining apparatus according to an embodiment of the present disclosure.
Figure 2:
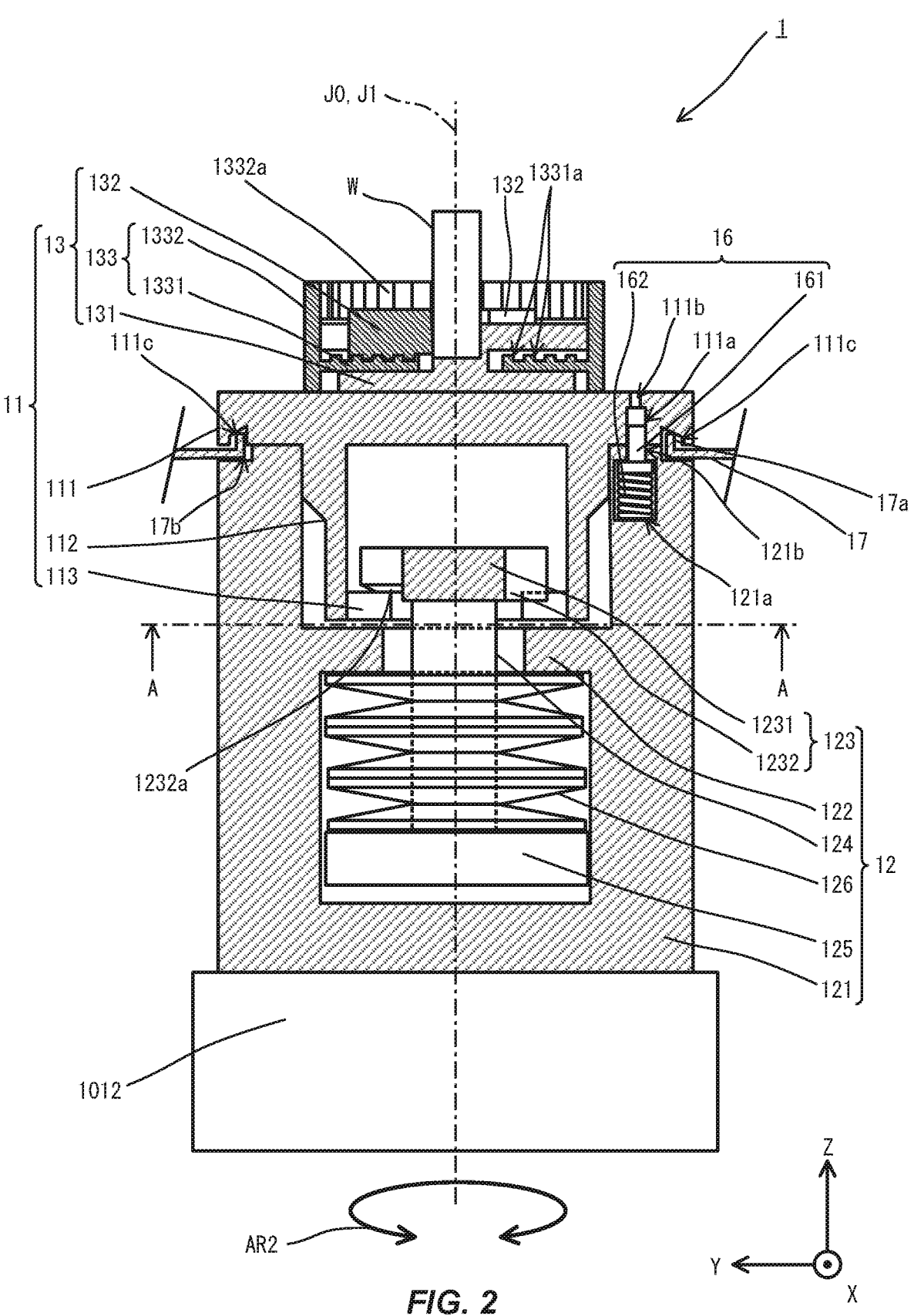
FIG. 2 is a cross-sectional view illustrating a workpiece holder according to an embodiment.

As illustrated in FIG. 1, the machining apparatus 100 according to the present embodiment includes an apparatus body 101, a holder magazine 102, and a transfer unit 103. The apparatus body 101 includes a holding unit 1011 for collectively holding the workpiece W and the workpiece holder 1, a cover 17 for covering the holding unit 1011, a rotation driving unit 1012 for rotationally driving the workpiece holder 1 provided inside the holding unit 1011, and a head (not illustrated) attached with a tool (not illustrated) for cutting a workpiece W held by the workpiece holder 1. Here, the workpiece holder 1 includes a holder head 11, a holder body 12 for holding the holder head 11, and a rotation restriction unit 16 for restricting rotation of the holder body 12 with respect to the holder head 11. The holder body 12 is coupled to the rotation driving unit 1012 of the apparatus body 101, and the rotation driving unit 1012 rotates the holder body 12 around a rotation axis J0. The cover 17 is made of a soft material such as rubber or elastomer, and an opening portion 17b in a circular shape in a top view is formed at the position of the holding unit 1011 corresponding to holder body 12. As illustrated in FIG. 2, the outer circumferential portion of the opening portion 17b of the cover 17 is formed with an annular rib 17a that surrounds the opening portion 17b and protrudes in the +Z direction.

Referring back to FIG. 1, the holder magazine 102 includes conveyance carriers (not illustrated) for holding multiple holder heads 11 and a carrier driving unit (not illustrated) for moving multiple conveyance carriers along a single orbit OB. The transfer unit 103 includes a conveyance arm 1031 at a distal end portion of which a pair of grip units 1032 for gripping a single holder head 11 is provided. A press mechanism 1033 for pressing a lock pin 161, explained later, provided on the holder body 12 is provided between the pair of grip units 1032 of the conveyance arm 1031. The transfer unit 103 further includes a horizontal driving unit (not illustrated) for driving the conveyance arm 1031 in the Y axis direction as illustrated by an arrow AR1, an up-and-down driving unit (not illustrated) for driving the conveyance arm 1031 in a Z axis direction, and an open-and-close driving unit (not illustrated) for opening and closing the grip unit 1032. Here, the horizontal driving unit moves the conveyance arm 1031 so that it is arranged at either a first position Pos1 at which the distal end portion of the conveyance arm 1031 overlaps the orbit OB of the holder magazine 102 in the Z axis direction, or a second position Pos2 at which the distal end portion of the conveyance arm 1031 overlaps the holder body 12 fixed to the holding unit 1011 in the Z axis direction.

Figure 3A:
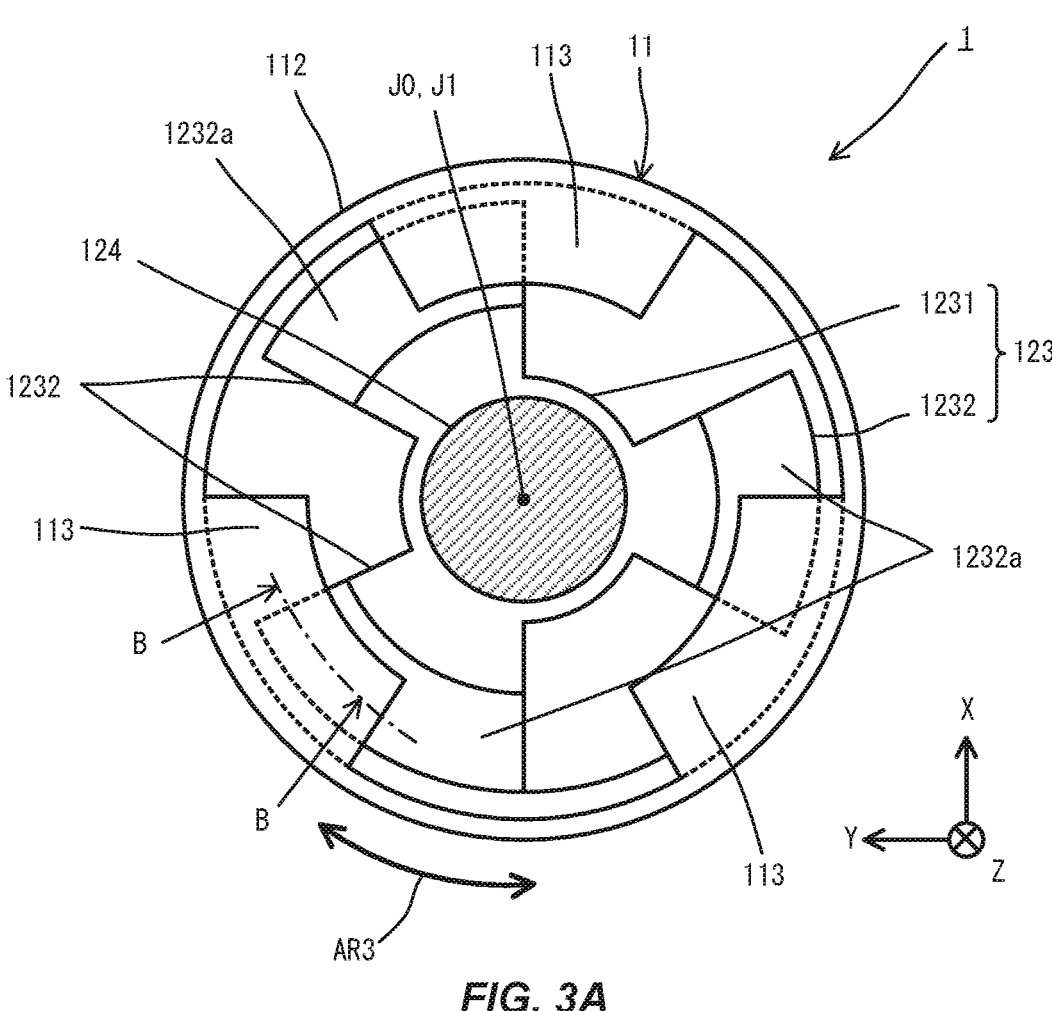
FIG. 3A is a cross-sectional view illustrating a part of the workpiece holder according to the embodiment.

As illustrated in FIG. 2, the workpiece holder 1 according to the present embodiment is a workpiece holder including the holder head 11 and the holder body 12. The holder head 11 includes a chuck unit 13 for holding a workpiece W, a support pedestal 111 that is in a disk shape for supporting the chuck unit 13 on the +Z direction side, cylindrical arms 112, and hooks 113. Here, the holder head is, for example, made of a material that does not corrode even if it is sterilized and washed in an autoclave, and can be used repeatedly. An annular groove 111c extending along the circumferential portion of the support pedestal 111 is formed on the circumferential portion on the −Z direction side of the support pedestal 111. Here, with the holder head 11 being in contact with the +Z direction side of the holder body 12, the rib 17a of the cover 17 fits on the inside of the groove 111c. Accordingly, the length from the inside of the workpiece holder 1 to the outside of the workpiece holder 1 at the border between the holder head 11 and the holder body 12 can be lengthened, so that there is an advantage that foreign matter present inside the workpiece holder 1 can be prevented from flowing out of the workpiece holder 1. A locking recessed portion 111a for locking the distal end portion of the lock pin 161 of the rotation restriction unit 16 explained later is formed, on the −Z direction side of the support pedestal 111, at a portion where the holder head 11 faces the rotation restriction unit 16 when the holder head 11 is fixed to the holder body 12. A communication hole 111b that is in communication from the bottom portion of the locking recessed portion 111a to the +Z direction side of the support pedestal 111 is formed in the support pedestal 111. The arm 112 extends to the −Z direction side of the support pedestal 111. The hooks 113 are in a plate shape of a fan shape in a top view, and as illustrated in FIG. 3A, extend in a direction perpendicular to the extension direction of the arm 112, in other words, the Z axis direction, from three positions at the distal end portions of the arms 112 on the −Z direction side. The three hooks 113 are evenly spaced along the circumferential direction of the distal end portions of arms 112.

Back to FIG. 2, the holder body 12 includes a bottomed cylindrical body portion 121, a retained portion 123 arranged inside the body portion 121 and caught by the hook 113 of the holder head 11, a shaft 124 arranged inside the body portion 121, disk springs 126, and a spring holding portion 125. The body portion 121 includes an inner collar portion 122 that extends in a direction perpendicular to a cylinder axis J1 from the inner wall of an approximate central portion in the direction of the cylinder axis J1, the inner collar portion 122 extending to approach the cylinder axis J1. The outer diameter dimension of the body portion 121 is set larger than the inner diameter dimension of the opening portion 17b of the cover 17. The inner diameter dimension of the body portion 121 is set smaller than the inner diameter dimension of the opening portion 17b of the cover 17. The rib 17a of the cover 17 is arranged on the end surface on the +Z direction side of the body portion 121. A spring containing portion 121a in the inside of which a coil spring 162 explained later is arranged and a communication hole 121b in communication from the spring containing portion 121a to the end surface on the +Z direction side of the body portion 121 are formed on the end portion on the +Z direction side of the body portion 121.

Figure 3B:
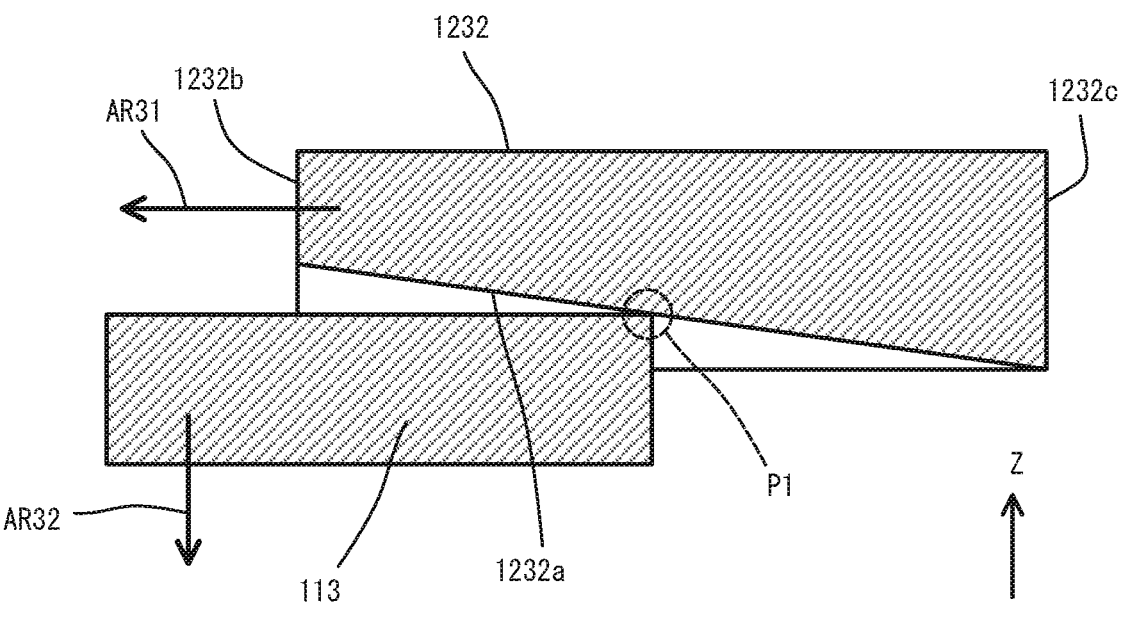
FIG. 3B is a cross-sectional view illustrating another part of the workpiece holder according to the embodiment.

As illustrated in FIG. 3A, the retained portion 123 includes a main piece 1231 in a circular shape in a top view and three lock-receiving pieces 1232 in a fan shape in a top view extending radially from three locations of the circumferential edge of the main piece 1231. An inclined surface 1232*a* is formed on the tip side of the lock-receiving piece 1232 on the side opposite to the chuck unit 13, in other words, the −Z direction side. As illustrated in FIG. 3B, this inclined surface 1232*a* is inclined to be situated on the −Z direction side from one end surface 1232*b*, facing the hook 113 in a direction of rotation of the body portion 121 around the cylinder axis J1, toward the other end surface 1232*c*. When the lock-receiving piece 1232 rotates in a direction indicated by an arrow AR31, a contact portion P1, with the hook 113, of the inclined surface 1232*a* of the lock-receiving piece 1232 accordingly moves toward the end surface 1232*c*, and the hook 113 is pushed down in a direction indicated by an arrow AR32. Here, with the hook 113 being in contact with the inclined surface 1232*a*, the retained portion 123 is rotated around the cylinder axis J1 of the body portion 121, and accordingly, the contact portion P1 of the hook 113 that is in contact with the inclined surface 1232*a* moves, on the inclined surface 1232*a*, from the one end surface 1232*b* to the other end surface 1232*c* of the lock-receiving piece 1232 of the retained portion 123, so that the disk springs 126 are compressed. As a result, the biasing force in the −Z direction of the retained portion 123 increases.

Referring back to FIG. 2, the shaft 124 is in a long cylindrical shape, and one end portion thereof on the +Z direction side in longitudinal direction is connected to the retained portion 123. The disk springs 126 are in a cylindrical shape, and has a shape that decreases in diameter in one direction along the cylinder axis direction. The multiple disk springs 126 (six disk springs 126 in FIG. 2) are passed over the shaft 124, and are biasing members for biasing the retained portion 123 in a direction away from the chuck unit 13, in other words, in the −Z direction. The spring holding portion 125 is in a disk shape, and is connected to the other end portion on the −Z direction side in the longitudinal direction of the shaft 124. The retained portion 123, the shaft 124, and the spring holding portion 125 are formed continuously and integrally from metal, resin, and the like. The multiple disk springs 126 are arranged such that, in the cylinder axis direction, the end portions with smaller inner diameters are in contact with each other, and the end portions with larger inner diameters are in contact with each other. Of the disk spring 126 arranged on the most −Z direction side among the multiple disk springs 126, the end portion with the larger inner diameter in the cylinder axis direction is in contact with the spring holding portion 125. Of the disk spring 126 arranged on the most +Z direction side among the multiple disk springs 126, the end portion with the larger inner diameter in the cylinder axis direction is in contact with the −Z direction side of the inner collar portion 122. Accordingly, the disk springs 126 bias the retained portion 123, the shaft 124, and the spring holding portion 125 toward the −Z direction side.

The holder body 12 is rotationally driven around the cylinder axis J1 as indicated by an arrow AR2 by the rotation driving unit 1012. Then, the retained portion 123 is rotated 60 degrees in a predetermined first rotation direction (clockwise direction of FIG. 3A) around the cylinder axis J1 of the body portion 121 with respect to the body portion 121, so that the retained portion 123 is biased in the −Z direction by the multiple disk springs 126 while it is in contact with the hook 113, and the retained portion 123 goes into a retained state in which the retained portion 123 is retained by the hook 113 on the −Z direction side. Also, the retained portion

123 is rotated from the retained state in a second rotation direction (counterclockwise direction of FIG. 3A), in other words, a direction opposite to the above-described first rotation direction, with respect to the body portion 121, so that the retained portion 123 goes into a released state in which the retained portion 123 does not overlap the hook 113 in the direction of the cylinder axis J1 and in which the retaining by the hook 113 is released.

The rotation restriction unit 16 includes: a coil spring 162 accommodated inside the spring containing portion 121*a* of the body portion 121 of the holder body 12 such that the extension and contraction direction of the coil spring 162 is along the Z axis direction; and a lock pin 161 which is inserted into the communication hole 121*b* of the body portion 121 and of which the end portion on the −Z direction side is in contact with the coil spring 162 so that the lock pin 161 is biased in the +Z direction by the coil spring 162. In a case where the retained portion 123 is in the released state, the retained portion 123 is rotated a predetermined rotation angle around the cylinder axis J1 of the body portion 121 with respect to the holder head 11, and when the retained portion 123 goes into the retained state, the end portion of the lock pin 161 on the +Z direction side fits in the locking recessed portion 111*a* of the support pedestal 111 of the holder head 11, so that the rotation restriction unit 16 restricts rotation of the retained portion 123 around the cylinder axis JP. Here, the predetermined rotation angle is set to, for example, 60 degrees.

Figure 4A:
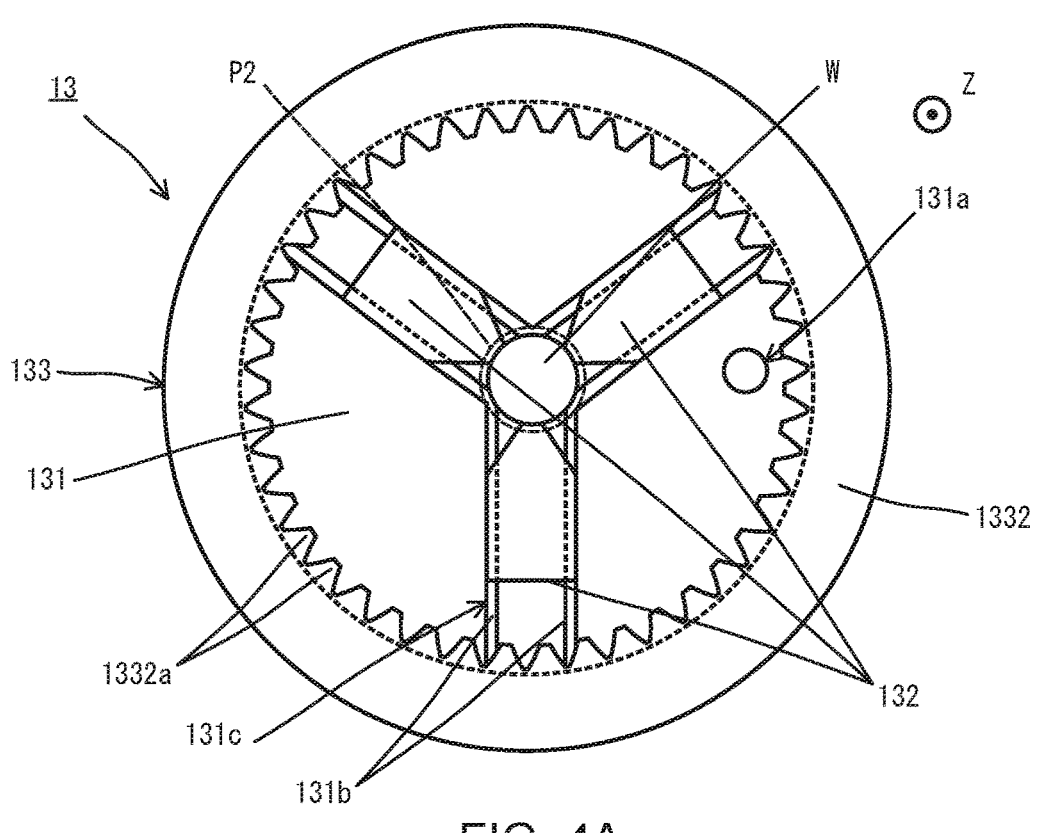
FIG. 4A is a top view illustrating a chuck unit according to the embodiment.
Figure 4B:
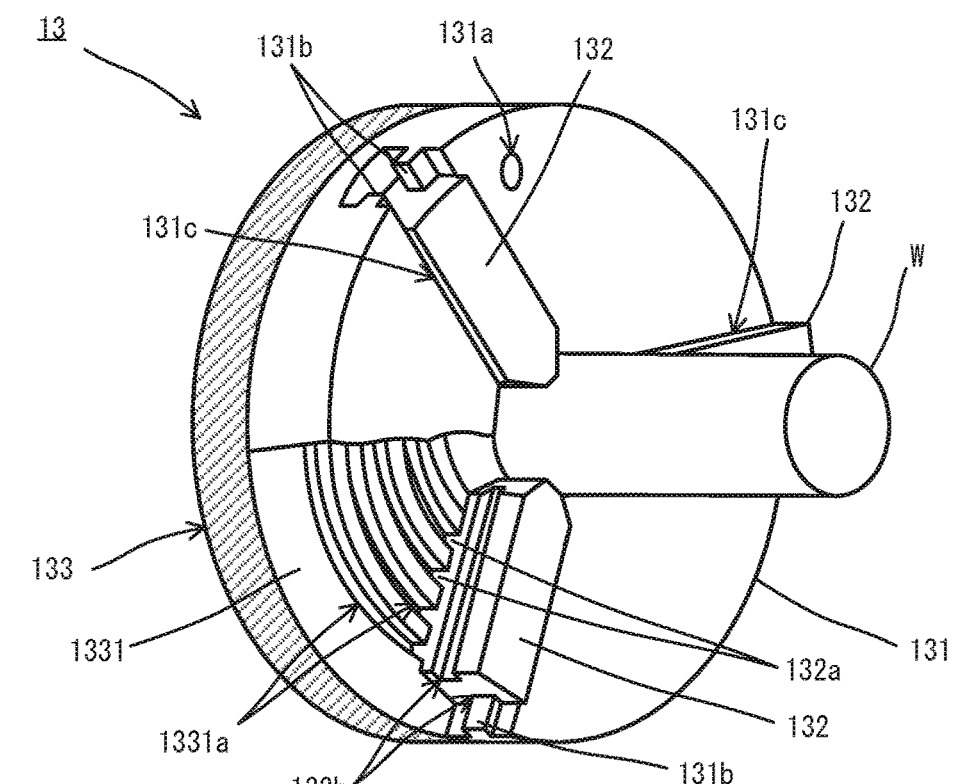
FIG. 4B is a partially broken perspective view illustrating the chuck unit according to the embodiment.

As illustrated in FIG. 4A and FIG. 4B, the chuck unit 13 includes multiple (three in FIG. 4A and FIG. 4B) chuck claws 132 for holding a workpiece W, a base 131, and a cam 133. As illustrated in FIG. 4B, each of the three chuck claws 132 is long, and includes multiple (four in FIG. 4B) protrusions 132*a* that protrude in the same direction as each other, in other words, −Z direction, on the bottom wall along the longitudinal direction. In addition, on a pair of side walls which are perpendicular to the bottom wall of the chuck claw 132 and which face each other in the lateral direction, guide grooves 132*b* are formed to extend along the longitudinal direction to guide movement of the chuck claw 132. The base 131 has a circular shape in a top view, and is provided with multiple slits 131*c* extending radially from a holding position P2 for holding the workpiece W in a top view to guide the three respective chuck claws 132. On the inner side of each of the three slits 131*c*, any one of the three chuck claws 132 is provided. On the inner walls of each of the slits 131*c*, ridges 131*b* are formed to extend along the extension direction of the slit 131*c* and to fit into the respective guide grooves 132*b* of the chuck claw 132. Furthermore, the base 131 is formed with a recessed portion 131*a* in which a distal end portion of a shaft 23 of a position adjustment jig 2 explained later fits when the position of the chuck claw 132 is adjusted to attach and detach the workpiece W to and from the chuck unit 13.

The cam 133 includes: a cam body 1331 which is in a disk shape and of which one surface side in the thickness direction is formed with grooves 1331*a*; and a cylindrical portion 1332 which is in a cylindrical shape and of which one end portion in the cylinder axis direction, in other words, an end portion on the −Z direction side, is continuous to the circumferential portion of the cam body 1331. The grooves 1331*a* extend spirally, and the protrusions 132*a* of the three respective chuck claws 132 fit along the extension direction of the grooves 1331*a* in a movable manner. On the other end portion of the cylindrical portion 1332 in the cylinder axis direction, in other words, the inner side of the end portion on the +Z direction side, inner teeth 1332*a* are formed to extend, over the entire circumference thereof, along the cylinder axis direction of the cylindrical portion 1332.

First, a user who uses the machining apparatus 100 according to the present embodiment has a workpiece W held with the holder head 11 and thereafter places the holder head 11 holding the workpiece W on the conveyance carrier of the holder magazine 102. Next, the machining apparatus 100 transfers the holder head 11 placed on the conveyance carrier of the holder magazine 102 from the holder magazine 102 to the apparatus body 101, and then executes the processing of the workpiece W with the apparatus body 101. Next, the machining apparatus 100 transfers the holder head 11 holding the processed workpiece W to the conveyance carrier of the holder magazine 102 again. Thereafter, the user retrieves the holder head 11 placed on the conveyance carrier of the holder magazine 102 and collects the processed workpiece W held by the holder head 11. Here, multiple holder heads 11 are accumulated in the holder magazine 102, and the machining apparatus 100 processes the workpieces W held by the multiple holder heads 11 one by one by sequentially transferring the multiple holder heads 11 to the apparatus body 101. Then, while the machining apparatus 100 is continuously processing the workpieces W held by the multiple holder heads 11, the user can perform in parallel a task of causing the holder head 11 to hold a workpiece W and a task of collecting the processed workpiece W from the holder head 11 holding the workpiece W.

Figure 5A:
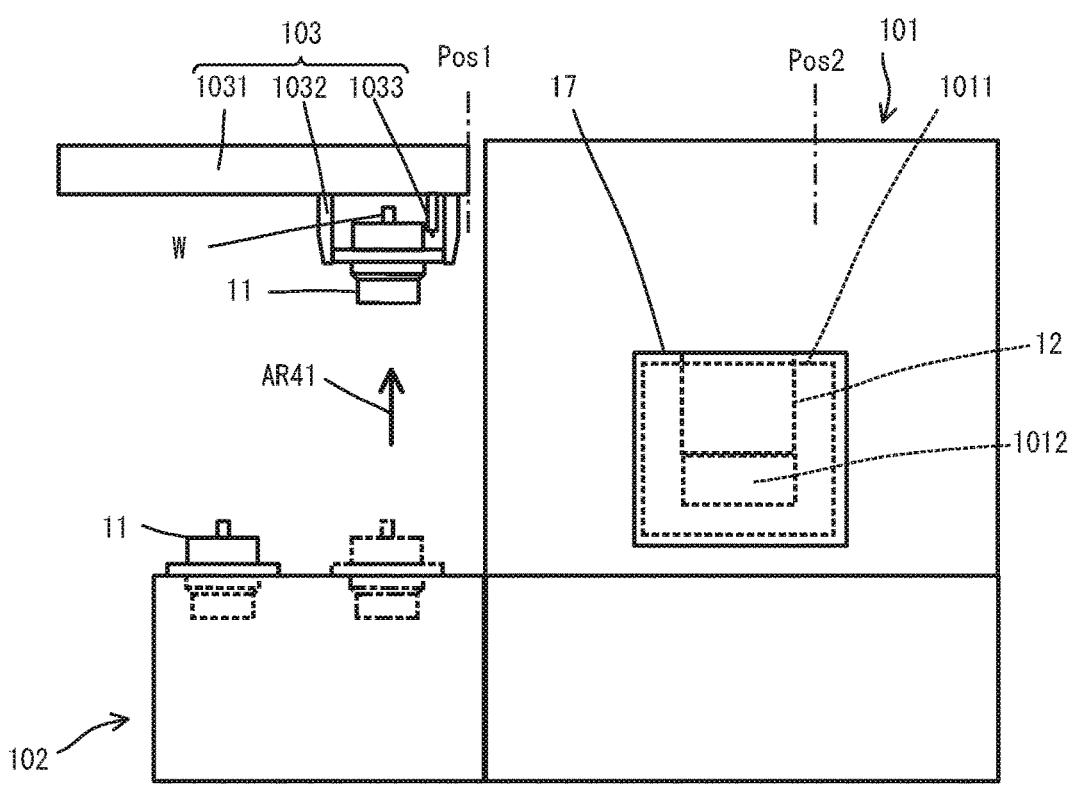
FIG. 5A is a side view illustrating how the transfer unit according to the embodiment receives a holder head from a holder magazine.
Figure 5B:
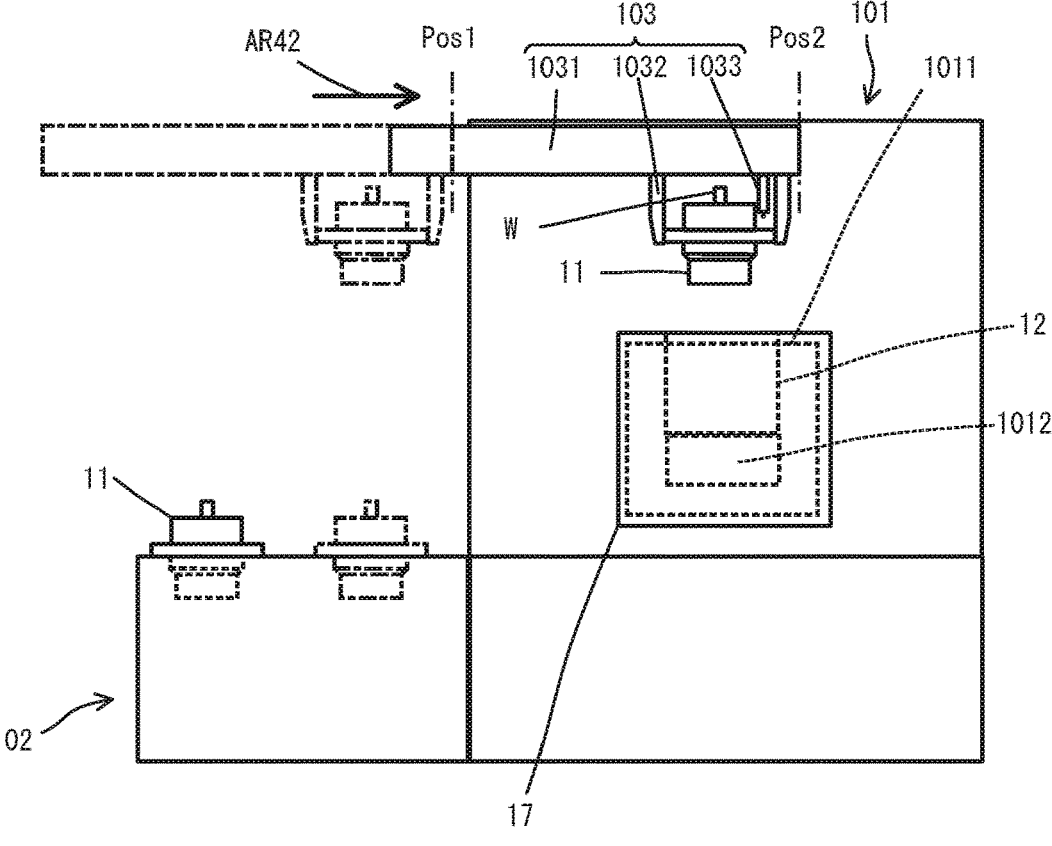
FIG. 5B is a side view illustrating how the transfer unit according to the embodiment transfers the holder head to an apparatus body.
Figures 6A, 6B:
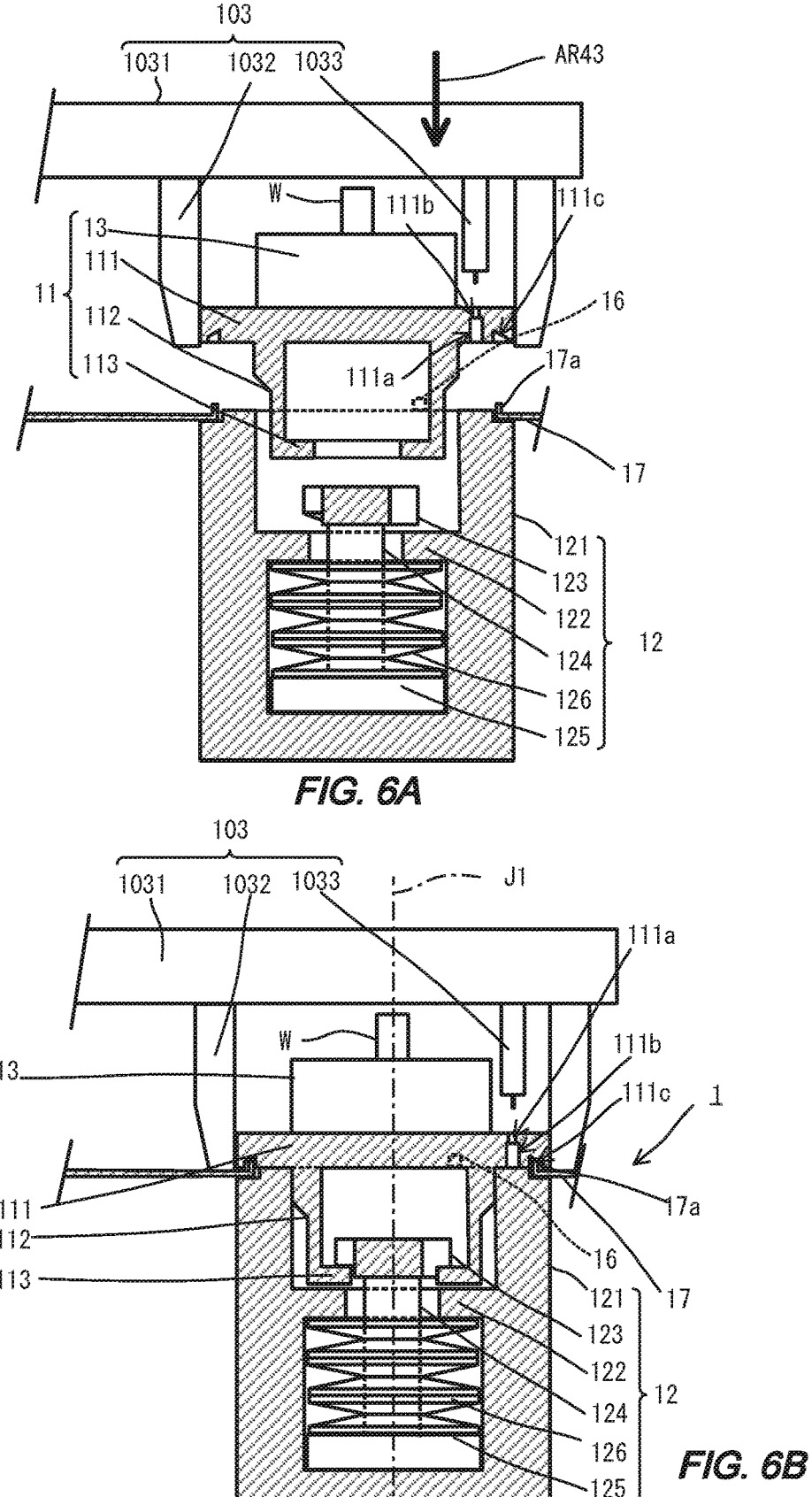
FIG. 6A is a cross-sectional view illustrating how the holder head according to the embodiment is inserted into the inside of the holder body.
FIG. 6B is a cross-sectional view illustrating a state in which the holder head according to the embodiment is arranged inside the holder body.
Figure 7A:
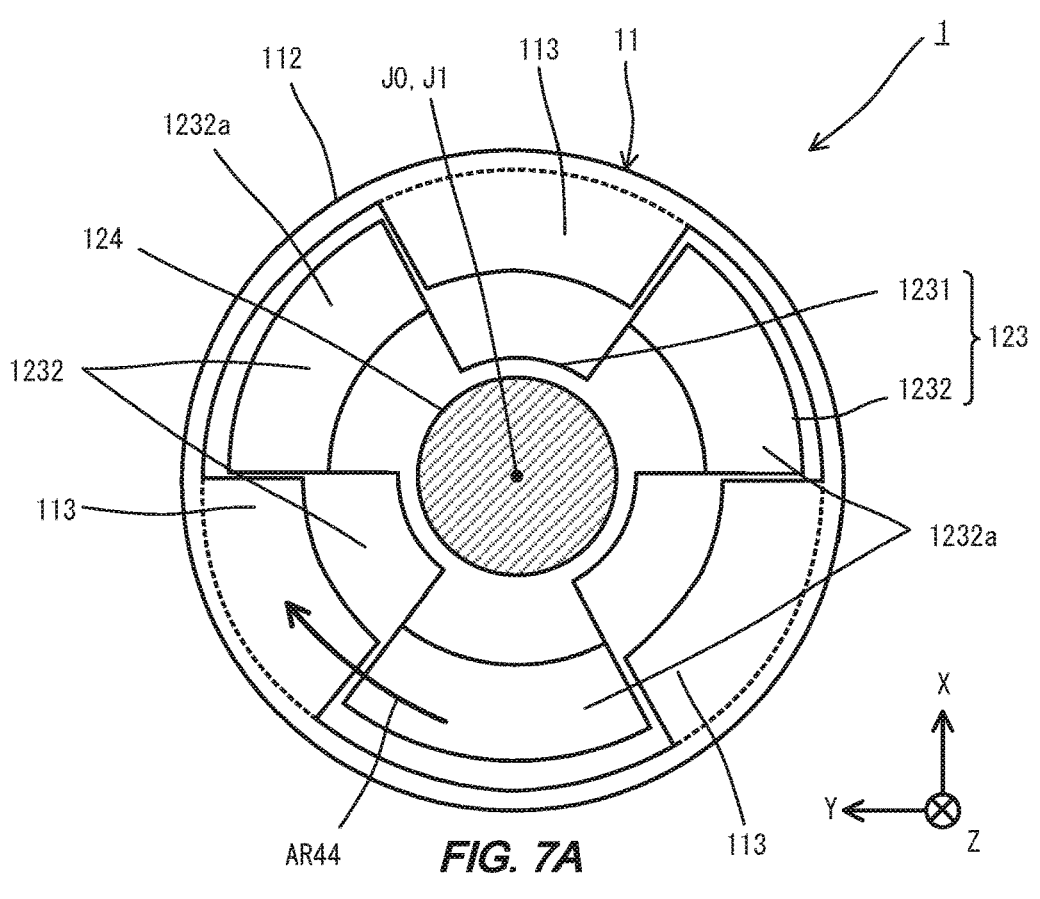
FIG. 7A is a cross-sectional view illustrating a part of the workpiece holder according to the embodiment.

Here, the operation of transferring the holder head 11 from the holder magazine 102 to the apparatus body 101 in order for the machining apparatus 100 according to the present embodiment to process the workpiece W held by the holder head 11 is described. First, the transfer unit 103 moves the conveyance arm 1031 to the first position Pos1, moves it in the −Z direction, and then causes the grip unit 1032 to grip one holder head 11. Next, transfer unit 103 moves conveyance arm 1031 to the +Z direction as indicated by an arrow AR41 in FIG. 5A, and then moves the convey-ance arm 1031 to the second position Pos2 as indicated by an arrow AR42 in FIG. 5B. Next, the transfer unit 103 moves the conveyance arm 1031 in the −Z direction as illustrated by an arrow AR43 in FIG. 6A, and causes the holder head 11 to come into contact with the holder body 12 attached to the holding unit 1011 as illustrated in FIG. 6B. At this time, the rib 17a of the cover 17 fits in the groove 111c of the holder head 11. Also, the lock-receiving piece 1232 of the retained portion 123 is provided between two hooks 113 adjacent to each other in the circumferential direction of the arm 112 as illustrated in FIG. 7A. After that, while the holder head 11 is held by the grip unit 1032, the rotation driving unit 1012 of the holding unit 1011 rotates the holder body 12 around the cylinder axis J1 of the body portion 121 so that the retained portion 123 is rotated around the cylinder axis J1 as indicated by an arrow AR44. At this time, as illustrated in FIG. 3A and FIG. 3B, a portion of the lock-receiving piece 1232 of the retained portion 123 comes into contact with the hook 113 from the +Z direction side of the hook 113, and the holder head 11 is fixed to the holder body 12. Simultane-ously, the lock pin 161 of the rotation restriction unit 16 fits in the locking recessed portion 111a of the holder head 11, so that the rotation of the holder body 12 with respect to the holder head 11 is restricted. Thereafter, the transfer unit 103 releases the grip of the grip unit 1032 and moves the conveyance arm 1031 in the +Z direction.

Next, the operation performed when the machining appa-ratus 100 according to the present embodiment returns the holder head 11 holding the processed workpiece W from the apparatus body 101 to the holder magazine 102 is described.

Figure 7B:
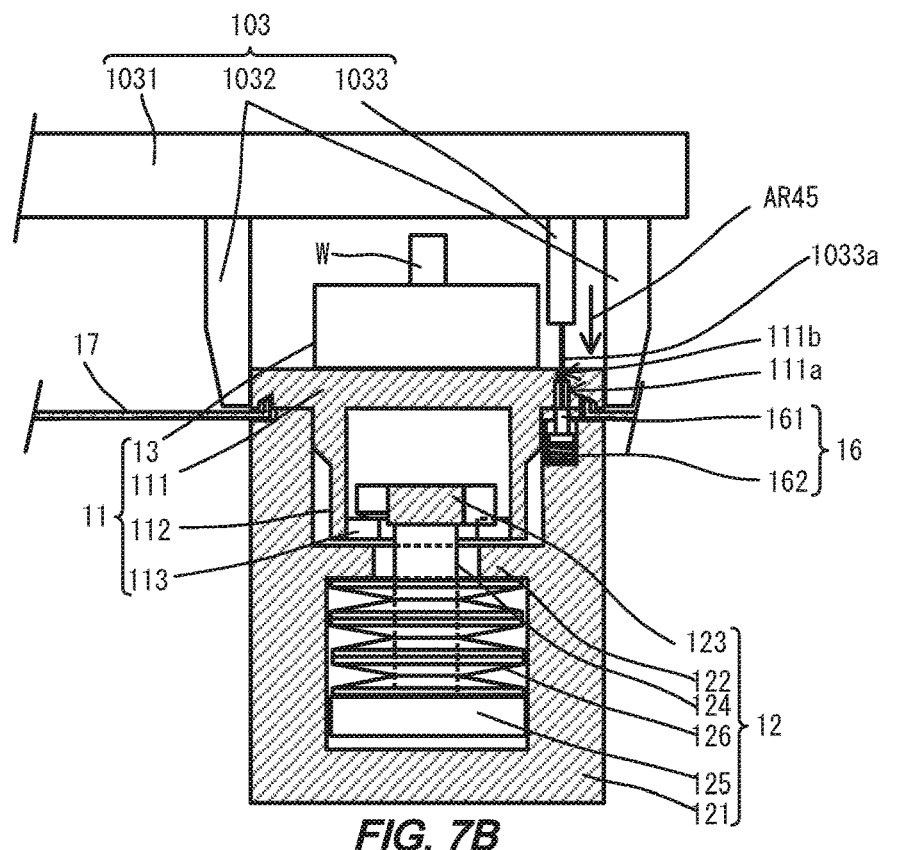
FIG. 7B is a cross-sectional view illustrating a state in which the holder head according to the embodiment is provided inside the holder body.

First, after the transfer unit 103 moves the conveyance arm 1031 to the second position Pos2 and then moves it in the −Z direction, the transfer unit 103 causes the grip unit 1032 to grip the holder head 11 fixed to the holder body 12. Next, while the holder head 11 is held by the grip unit 1032, the press mechanism 1033 inserts a needle 1033a through the communication hole 111b of the holder head 11 as illustrated by an arrow AR45 in FIG. 7B to press the lock pin 161 in the −Z direction, so that the lock pin 161 is separated from the locking recessed portion 111a to allow the holder body 12 to rotate with respect to the holder head 11. Next, the rotation driving unit 1012 of the holding unit 1011 rotates the holder body 12 around the cylinder axis J1 of the body portion 121, and again, as illustrated in FIG. 7A, the lock-receiving piece 1232 of the retained portion 123 is arranged between two hooks 113 adjacent to each other in the circumferential direction of the arm 112. This allows the holder head 11 to be separated from the holder body 12. Thereafter, the transfer unit 103 moves the conveyance arm 1031 in the +Z direction, then moves it to the first position Pos1, thereafter moves the conveyance arm 1031 in the −Z direction, and places the holder head 11 on the conveyance carrier of the holder magazine 102. Then, the transfer unit 103 releases the grip of the grip unit 1032 and then moves the conveyance arm 1031 in the +Z direction.

Figure 8:
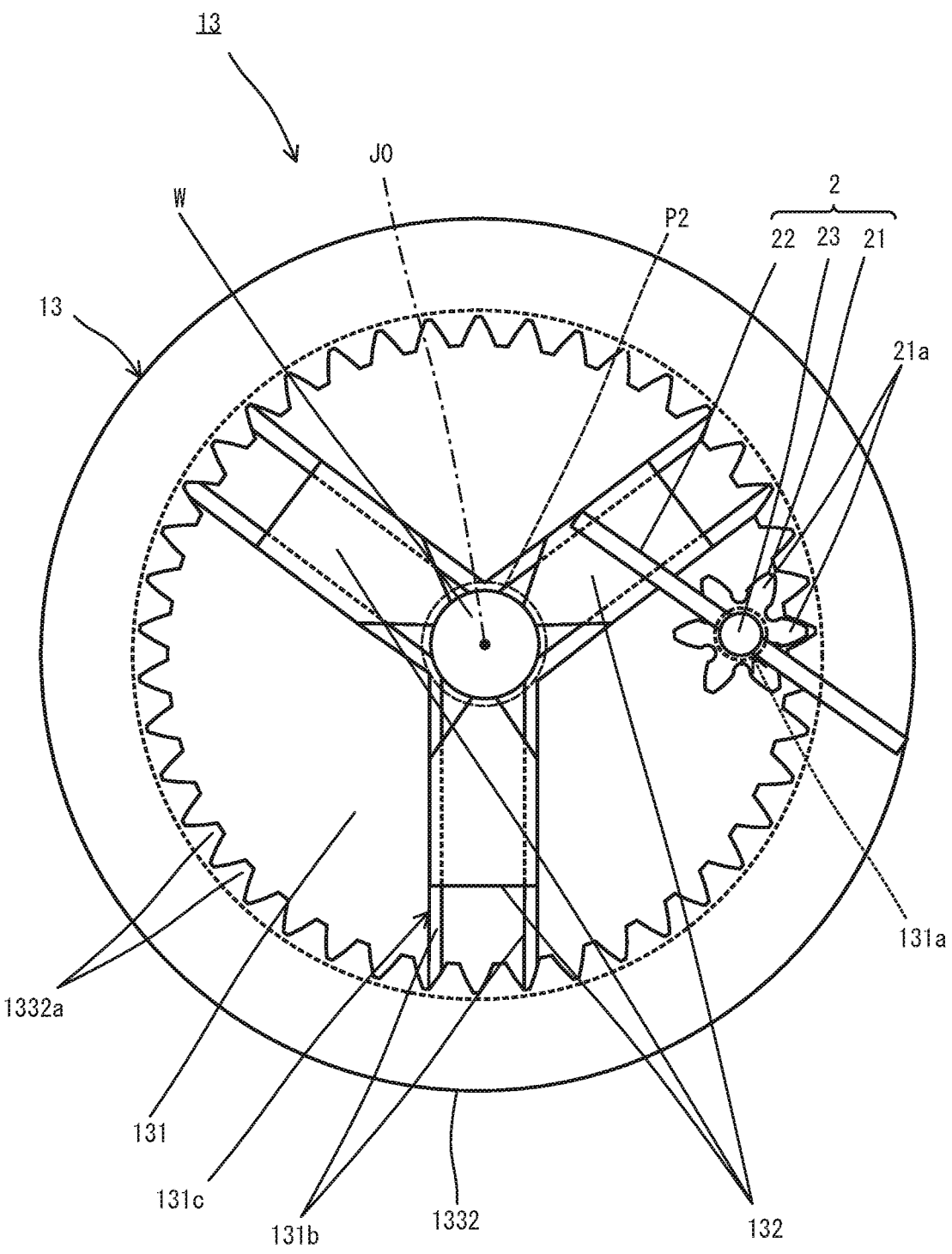
FIG. 8 is a top view illustrating a state in which a position adjustment jig is attached to the workpiece holder according to the embodiment.

Next, a position adjustment method of the chuck claw 132 of the chuck unit 13 when the user of the machining apparatus 100 according to the present embodiment causes the holder head 11 to hold the workpiece W or collect the workpiece W held by the holder head 11 is explained. The position adjustment jig 2 as illustrated in FIG. 8 is used to adjust the positions the of chuck claws 132. The position adjustment jig 2 includes: a gear 21 including multiple teeth 21a that mesh with the inner teeth 1332a of the cam 133; a long shaft 23 fixed with the gear 21; and a grip stick 22 which is long and which is fixed to the shaft 23 and gripped by the user such that the longitudinal direction of the grip stick 22 is perpendicular to the longitudinal direction of the shaft 23. Here, the gear 21 is set so that its teeth mesh with the inner teeth 1332a of the cam 133 while the distal end portion of the shaft 23 fits in the recessed portion 131a of the base 131. Then, with the distal end portion of the shaft 23 fit in the recessed portion 131a formed in the base 131 and the gear 21 meshing with the inner teeth 1332a of the cam 133, the user rotates the shaft 23, so that the cam 133 can be rotated, and the chuck claws 132 can be moved along slits 131c of base 131. Here, in order have the workpiece W held by the holder head 11, the chuck claw 132 is moved in direction to approach the holding position P2, with work-piece W placed at the holding position P2, so that the distal end portions of the chuck claws 132 are brought into contact with the workpiece W. Conversely, in order to collect the workpiece W from the holder head 11, the chuck claws 132 are moved toward the circumferential portion of base 131 to release the chuck claws 132 from the workpiece W.

As explained above, the workpiece holder 1 according to the present embodiment includes: the holder head 11 includ-ing the chuck unit 13 for holding the workpiece W, the support pedestal 111 for supporting the chuck unit 13, and the hook 113; and the holder body 12 including the retained portion 123 that can be either in a retained state in which the retained portion 123 is rotated around the cylinder axis J1 of the body portion 121 so that it is retained by the hook 113 or in the released state in which retaining by the hook 113 is released. Accordingly, when multiple workpieces W are processed, multiple holder heads 11 are prepared in advance, and while the holder bodies 12 provided in the machining apparatus 100 are caused to sequentially hold the multiple holder heads 11 and multiple workpieces W are sequentially processed, the task of causing the holder head 11 to hold the workpiece W and the task of collecting the workpiece W from the holder head 11 can be performed in parallel. Therefore, the throughput for processing multiple workpieces W can be improved.

The lock-receiving piece 1232 of the retained portion 123 according to the present embodiment is provided with this inclined surface 1232a that is inclined to be situated on the −Z direction side from one end surface 1232b, facing the hook 113 of the holder head 11 in a direction of rotation of the body portion 121 around the cylinder axis J1 on the −Z direction side, toward the other end surface 1232c. Furthermore, with the hook 113 of the holder head 11 being in contact with the inclined surface 1232a of the lock-receiving piece 1232, the retained portion 123 is rotated around the cylinder axis J1 of the body portion 121, and accordingly, the contact portion P1 of the hook 113 that is in contact with the inclined surface 1232a moves from the one end surface 1232b to the other end surface 1232c of the lock-receiving piece 1232. Accordingly, the disk springs 126 are compressed, and the biasing force in the −Z direction of the retained portion 123 increases. As a result, even if the holder body 12 is rotated with a relatively small torque, the multiple disk springs 126 can be compressed with a relatively strong force. Therefore, since the disk springs 126 having a relatively large restoring force in response to compression can be used, the holder head 11 can be brought into close contact with the holder body 12 with a relatively strong force.

Furthermore, the workpiece holder 1 according to the present embodiment includes the rotation restriction unit 16 restricting rotation with respect to the holder head 11 of the holder body 12. Accordingly, the holder body 12 can be prevented from being rotated with respect to the holder head 11 to a rotation angle more than necessary, and therefore, damage to the hook 113 and the lock-receiving piece 1232 due to excessive rotation of the holder body 12 with respect to the holder head 11 can be alleviated.

Incidentally, a scroll chuck usually has the base fixed and has the cam rotate so that the chuck claw performs open-and-close operations. In this case, it is necessary to rotate the cam with a relatively large torque. For this reason, in many cases, the scroll chuck has a structure in which the distal end portion of the grip stick is fixed to the outer wall of the cam, and force is applied to the proximal end portion of the grip stick to rotate the cam. However, in the case of this structure, the force is concentrated on the fixed portion of the grip stick, and there is a risk that the cam may be distorted. In contrast, the cam 133 according to the present embodiment is in a cylindrical shape, and includes the cylindrical portion 1332 formed with, on the inner side, the inner teeth 1332a extending in the cylinder axis direction, and when the distal end portion of the shaft 23 of the position adjustment jig 2 fits in the recessed portion 131a formed in the base 131, the teeth 21a of the gear 21 of the position adjustment jig 2 mesh with the inner teeth 1332a. Furthermore, the number of teeth of the gear 21 of the position adjustment jig 2 is smaller than the number of teeth of the inner teeth 1332a of the cylindrical portion 1332, and therefore, when the shaft 23 is rotated to adjust the position of the chuck claws 132 by rotating the cam 133, the torque required to rotate the shaft 23 can be reduced to a relatively small level. Furthermore, the position adjustment jig 2 rotates the gear 21 with respect to the distal end portion of the shaft 23, as the fulcrum, that fits in the recessed portion 131a formed in the base 131 to rotate the cam 133 having the inner teeth 1332a with which the gear 21 meshes, and therefore, a force applied in the direction of the rotation axis J0 does not occur, and the load in the direction of the rotation axis J0 can be reduced to zero. For this reason, when the chuck claws 132 hold the workpiece W, the force applied in the direction of the rotation axis J0 to the base 131 can be reduced to zero, and accordingly, damage to the chuck unit 13 due to excessive load applied to the chuck unit 13 can be alleviated.

Although the embodiment of the present disclosure has been described above, the present disclosure is not limited to the configuration of the above-described embodiment. For example, the position adjustment jig may include: a grip unit gripped by the user when the shaft 23 is rotated, and a clutch that connects the shaft 23 and the grip unit and that blocks transmission of rotation from the grip unit to the shaft 23 when the torque applied to the grip unit becomes equal to or higher than a predetermined reference torque.

According to this configuration, excessive torque is prevented from being applied to the shaft 23, and therefore, damage to the workpiece W caused by pressing the workpiece W with the chuck claws 132 with an excessive force can be alleviated.

According to the embodiment, an example in which the multiple disk springs 126 bias the retained portion 123 in the −Z direction has been explained, but the biasing member that biases the retained portion 123 in the −Z direction is not limited thereto. For example, the holder body may include coil springs connected between the end portion of the shaft 124 on the −Z direction side and the bottom wall of the body portion 121.

In the embodiment, an example in which the holder magazine 102 have the multiple holder heads 11 arranged along the orbit OB as illustrated in FIG. 1 while the multiple holder heads are placed on the conveyance carriers has been explained. However, the arrangement of the multiple holder heads 11 in the holder magazine 102 is not particularly limited, and for example, the multiple holder heads 11 may be arranged along a circular orbit or an elliptical orbit, or may be arranged in a lattice form.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The present disclosure is suitable as a machining apparatus for cutting bones.

The invention claimed is:

1. A workpiece holder comprising:
   a holder head that includes a chuck unit for holding a workpiece, a support pedestal for supporting the chuck unit, an arm extending to a side of the support pedestal opposite to the side of the chuck unit, and a hook extending in a direction perpendicular to an extension direction of the arm from a distal end portion of the arm; and
   a holder body that includes a body portion in a cylindrical shape for supporting the holder head, with one end portion in a cylinder axis direction being in contact with a circumferential portion of the support pedestal, a retained portion arranged inside the body portion and rotated around a cylinder axis of the body portion to be in either a retained state in which the retained portion comes into contact with the hook and be biased in a direction away from the chuck unit so that the retained portion is retained on a side opposite to the side of the chuck unit by the hook, or a released state in which the retained portion does not overlap the hook in the cylinder axis direction so that retaining by the hook is released, and a biasing member for biasing the retained portion in a direction away from the chuck unit.

2. The workpiece holder according to claim 1, wherein the arm is in a cylindrical shape, the hook is in a plate shape, and extends, from another end portion of the arm on a side opposite to one end portion of the arm on a side of the support pedestal in the cylinder axis direction, in a direction perpendicular to the cylinder axis direction of the arm so as to approach the cylinder axis of the arm, the retained portion is in a plate shape, and is formed with, on a side opposite to the side of the chuck unit in a thickness direction, an inclined surface that is inclined away from the chuck unit from one end surface, facing the hook in a direction of rotation of the body portion around the cylinder axis, toward another end surface, the biasing member is a spring provided inside the body portion, and with the hook being in contact with the inclined surface, the retained portion is rotated around the cylinder axis of the body portion, and a position of the hook that is in contact with the inclined surface moves, on the inclined surface, from a side of the one end surface to a side of the another end surface of the retained portion, so that the spring is compressed or extended, and a biasing force of the retained portion in a direction away from the chuck unit increases.

3. The workpiece holder according to claim 2, further comprising:

a rotation restriction unit for restricting rotation of the holder body with respect to the holder head.

4. The workpiece holder according to claim 2, wherein the chuck unit includes:

a plurality of chuck claws holding the workpiece and including protrusions protruding in a same direction as each other;

a base provided with a plurality of slits extending radially from a holding position for holding the workpiece in a top view to guide the respective chuck claws, any one of the chuck claws being arranged on an inner side of each of the slits; and a cam formed with grooves which extend spirally and in which the protrusions of the respective chuck claws fit along an extension direction in a movable manner, the cam includes:

a cam body which is in a disk shape and of which one surface side in a thickness direction is formed with the grooves; and a cylindrical portion which is in a cylindrical shape and of which one end portion in the cylinder axis direction is continuous to a circumferential portion of the cam body, the cylindrical portion being formed with, on an inner side of another end portion, inner teeth extending, over an entire circumference of the another end portion, along the cylinder axis direction, and a position adjustment jig includes a gear that meshes with the inner teeth and a shaft fixed to the gear, the position adjustment jig being for adjusting positions of the chuck claws, the base being formed with a recessed portion such that teeth of the gear mesh with the inner teeth while a distal end portion of the shaft of the position adjustment jig fits in the recessed portion.

5. The workpiece holder according to claim 4, wherein the position adjustment jig further includes:

a grip unit gripped by a user when the shaft is rotated; and a clutch that connects the shaft and the grip unit and that blocks transmission of rotation from the grip unit to the shaft when a torque applied to the grip unit becomes equal to or higher than a predetermined reference torque.

6. The workpiece holder according to claim 1, wherein the chuck unit includes:

a plurality of chuck claws holding the workpiece and including protrusions protruding in a same direction as each other;

a base provided with a plurality of slits extending radially from a holding position for holding the workpiece in a top view to guide the respective chuck claws, any one of the chuck claws being arranged inside each of the slits; and a cam formed with grooves which extend spirally and in which the protrusions of the respective chuck claws fit along an extension direction in a movable manner, the cam includes:

a cam body which is in a disk shape and of which one surface side in a thickness direction is formed with the grooves; and a cylindrical portion which is in a cylindrical shape and of which one end portion in the cylinder axis direction is continuous to a circumferential portion of the cam body, the cylindrical portion being formed with, on an inner side of another end portion, inner teeth extending, over an entire circumference of the another end portion, along the cylinder axis direction, and a position adjustment jig includes a gear that meshes with the inner teeth and a shaft fixed to the gear, the position adjustment jig being for adjusting positions of the chuck claws, the base being formed with a recessed portion such that teeth of the gear mesh with the inner teeth while a distal end portion of the shaft of the position adjustment jig fits in the recessed portion.

7. The workpiece holder according to claim 6, wherein the position adjustment jig further includes:

a grip unit gripped by a user when the shaft is rotated; and a clutch that connects the shaft and the grip unit and that blocks transmission of rotation from the grip unit to the shaft when a torque applied to the grip unit becomes equal to or higher than a predetermined reference torque.

8. The workpiece holder according to claim 1, further comprising:

a rotation restriction unit for restricting rotation of the holder body with respect to the holder head.

9. A machining apparatus comprising:

a holder magazine for holding a plurality of holder heads of a workpiece holder including the holder heads and holder bodies, each of the hold heads including a chuck unit for holding a workpiece, a support pedestal for supporting the chuck unit, an arm extending to a side of the support pedestal opposite to the side of the chuck unit, and a hook extending in a direction perpendicular to an extension direction of the arm from a distal end portion of the arm, each of the holder bodies including a body portion in a cylindrical shape for supporting the holder head, with one end portion in a cylinder axis direction being in contact with a circumferential portion of the support pedestal, a retained portion arranged inside the body portion and rotated around a cylinder axis of the body portion to be in either a retained state in which the retained portion comes into contact with the hook and be biased in a direction away from the chuck unit so that the retained portion is retained on a side opposite to the side of the chuck unit by the hook, or in a released state in which the retained portion does not overlap the hook in the cylinder axis direction so that retaining by the hook is released, and a biasing member for biasing the retained portion in a direction away from the chuck unit;

a holding unit that includes: the holder body of the workpiece holder; and a rotation driving unit support-ing the holder body and rotationally driving the holder body around the cylinder axis of the body portion; and a transfer unit that holds any one of the holder heads held by the holder magazine and transfers the any one of the holder head to the holder body, wherein the transfer unit holds the holder head while one end portion of the body portion in the cylinder axis direc-tion is in contact with a circumferential portion of the support pedestal, and the rotation driving unit rotates the holder body around the cylinder axis of the body portion while the holder head is held by the transfer unit, whereby the holder head is fixed to the holder body.

* * * * *